United States Patent

[11] 3,569,688

[72] Inventor Thomas A. Brendle
    Hamburg, N.Y.
[21] Appl. No. 786,723
[22] Filed Dec. 24, 1968
[45] Patented Mar. 9, 1971
[73] Assignee Audn Corporation
    Hamburg, N.Y.

[54] A MULTIPLIER IN WHICH A CAPACITOR IS CHARGED AT A RATE PROPORTIONAL TO THE PRODUCT OF TWO ANALOG INPUTS
9 Claims, 6 Drawing Figs.

[52] U.S. Cl. ............................................. 235/194,
    235/150.52, 328/160
[51] Int. Cl. ............................................. G06j 7/16,
    G06j 1/00
[50] Field of Search .................................. 235/194,
    195, 196, 193.5, 183, 150.5, 150.51, 150.52,
    150.53; 328/160, 161, 144; 307/229, 230

[56] References Cited
UNITED STATES PATENTS

| | | | |
|---|---|---|---|
| 3,131,298 | 4/1964 | Creusere | 235/194 |
| 3,333,092 | 7/1967 | Hauser, Jr. | 235/183 |
| 3,383,501 | 5/1968 | Patchell | 235/183X |

*Primary Examiner*—Malcolm A. Morrison
*Assistant Examiner*—Joseph F. Ruggiero
*Attorney*—Bean & Bean ABSTRACT: A capacitor is charged by a train of pulses derived from a pair of analog input signals and a feedback amplifier is connected to the capacitor to discharge it at the same rate as it is being charged so that the voltage across the capacitor is held at some fixed level to cause the voltage drop across the feedback path to be proportional to the product of the analog input signals. One analog input signal is converted to a digital signal whose frequency is linearly related to the amplitude of the analog input signal and the other analog input signal is passed to a pump diode circuit at such frequency whereby a capacitor of the pump diode circuit is charged as stated. Multiplication, division, square root extraction and the sum of plural products are some of the functions which may be performed.

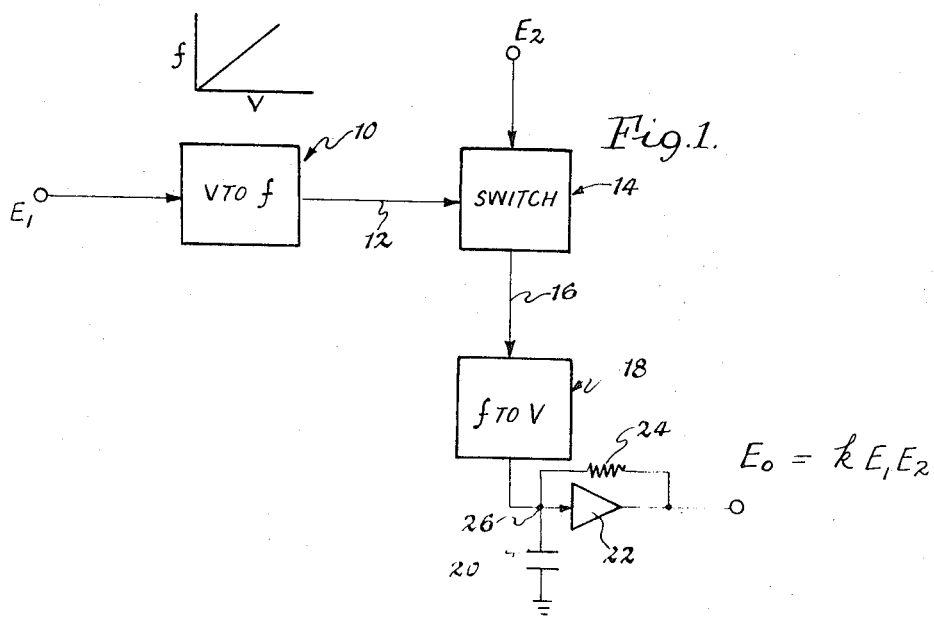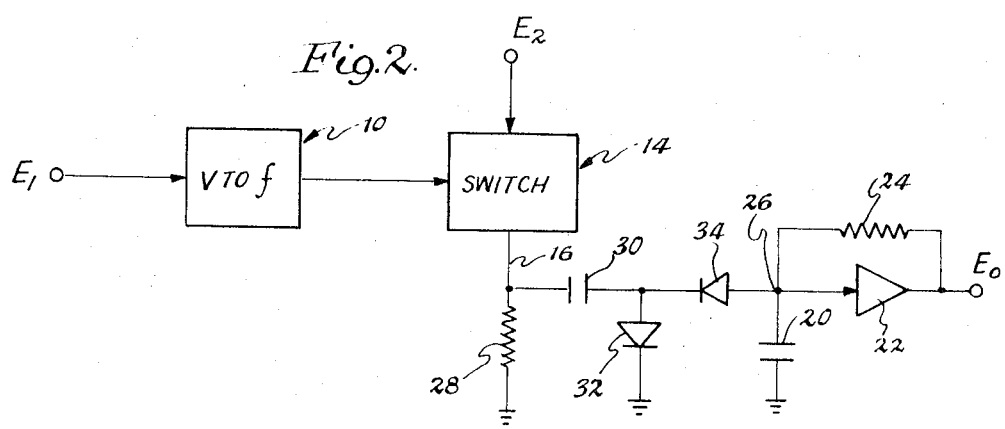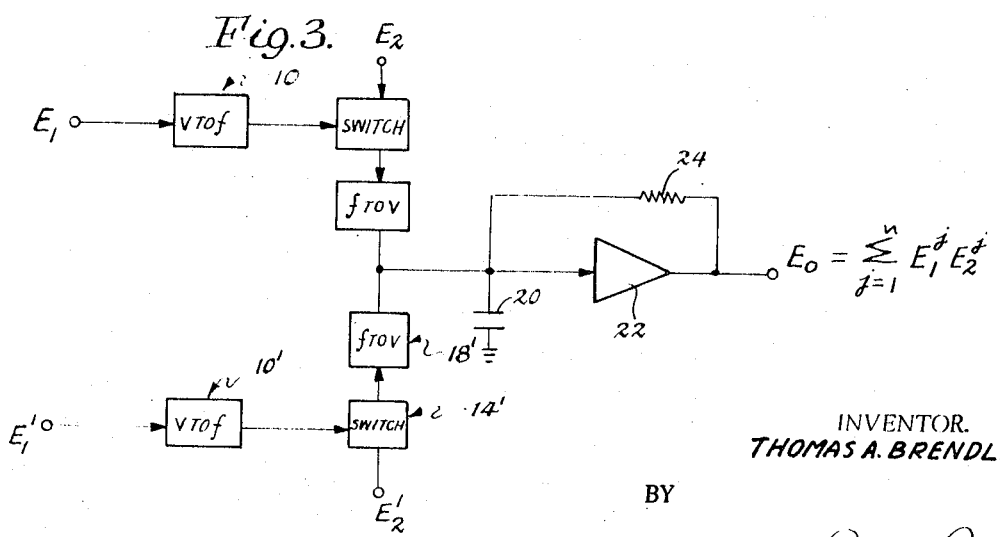

INVENTOR.
THOMAS A. BRENDLE

BY

Bean & Bean
ATTORNEYS

INVENTOR.
THOMAS A. BRENDLE
BY
Bean + Bean
ATTORNEYS

3,569,688

A MULTIPLIER IN WHICH A CAPACITOR IS CHARGED AT A RATE PROPORTIONAL TO THE PRODUCT OF TWO ANALOG INPUTS

BRIEF SUMMARY OF THE INVENTION

Two analogue input voltages are employed to produce an output signal proportional to the product of the inputs. One input is converted to a digital signal whose frequency is linearly related to the amplitude of the input and this digital signal and the other analogue input are used to charge a capacitor cyclically at the frequency of the digital signal. The capacitor is connected to a feedback amplifier amplifier which discharges the capacitor at a rate equal to its charging rate so that the voltage across the capacitor is held at a fixed value, which may be zero, whereby the voltage drop across the feedback path is proportional to the product of the two analogue input signals. A switch is used to charge the capacitor from the second input at the frequency of the digital signal and a digital-to-analogue device is fed by the switch to transfer a charge to the capacitor which forms part of the digital-to-analogue device whereby the time average of the capacitor charging current is proportional to the product of the analogue inputs. An amplifier having a feedback path is connected to the capacitor to produce a current, through the feedback path, which is equal and opposite to the charging current for the capacitor. Thus, the voltage drop across the feedback path likewise becomes proportional to the product of the inputs.

The function of the digital-to-analogue device and of the output capacitor is effected by a pump diode circuit, and by expanding this basic system to include a differential amplifier fed by the feedback amplifier, a third analogue input signal may be introduced.

BRIEF DESCRIPTION OF THE DRAWING FIGURES

FIG. 1 is a diagrammatic view illustrating the principles of the present invention;

FIG. 2 is a view similar to FIG. 1 but showing the use of a pump diode circuit;

FIG. 3 is a view showing a plurality of basic circuits for producing an output which is the sum of the products of several pairs of input signals;

DETAILED DESCRIPTION OF THE INVENTION

Figure 4:
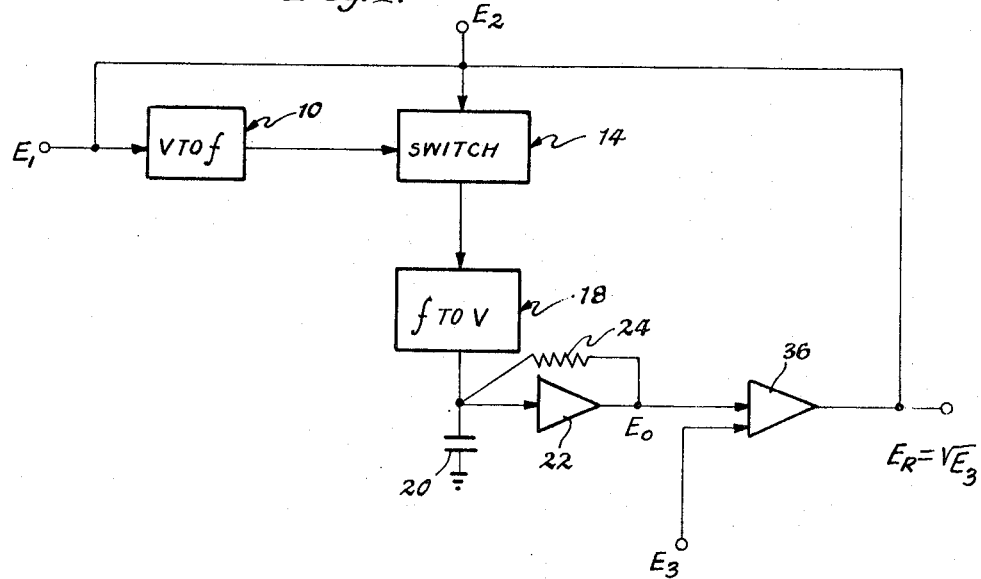
FIG. 4 is a view showing the basic circuit expanded to include a differential amplifier for introducing a third analogue input signal.

Reference to FIG. 1 reveals the basic circuit according to this invention, such circuit including a device 10 having the analogue input signal $E_1$ applied thereto and producing, at the terminal 12, a digital signal whose frequency $f$ is linearly related to the input $E_1$. The switch 14 is controlled by this digital signal and passes the analogue input signal $E_2$ in response thereto to produce a digital signal at the terminal 16 whose amplitude is related to the input signal $E_2$ and whose frequency is $f$. This latter signal is converted to an analogue signal by the digital-to-analogue device 18 and this analogue output is applied to the capacitor 20. The current pulses applied to the capacitor 20 are thus functionally related to the product of the two input signals $E_1$ and $E_2$. The amplifier 22 having the feedback path including the resistor 24, however, serves to maintain the junction 26 at zero or some fixed potential so that the current flowing through the feedback loop is equal and opposite to the time average of the current pulses flowing to the capacitor 20, whereby the voltage drop across the feedback resistor 24 establishes and maintains the output voltage $E_o$. Since the output voltage $E_o$ is directly related to the current applied to the capacitor, it too, is related to the product of the input signals $E_1$ and $E_2$. Thus, the relationship $E_o = k E_1 E_2$ [$k$ is a constant] prevails. By construction of the circuits, $k$ may be made to equal unity so that $E_o = E_1 E_2$. By causing $E_1 = E_2$, the relationship $E_1 = E_2 = \sqrt{E_o}$ obtains.

The converter 10 and switch 14 may take any convenient and conventional form, but the circuit 18 inclusive of the capacitor 20 preferably takes the form of a pump diode circuit as shown in FIG. 2. As shown, the digital output at 16 is applied across the load resistor 28 every time the switch 14 is closed to charge the capacitor 30 through the diode 32. The value of the load resistor 28 is chosen to charge the capacitor 30 to $E_2$. When the switch 14 is opened, the capacitor 30 discharges through the resistor 28, the diode 34 and the capacitor 20, thus depositing a charge $q$ on the capacitor 20 for every switch closing. The feedback amplifier, however, maintains the voltage at the junction 26 at some fixed potential by discharging the capacitor 20 at the same rate at which it is charged. Thus, since the total charge is a time integral, same is equal to $kE_2 f$, where $k$ is a constant and $f$ is the frequency of the signal at 16, in turn proportional to the analogue signal $E_1$.

By applying a plurality of charge-transferring devices to the capacitor 20, as shown in FIG. 3, the output $E_o$ of the circuit may be made equal to $\sum_{j=1}^{n}$ In FIG. 3, $n=2$ and $E_o = E_1 E_2 + E_{1'} E_{2'}$, the converter 10', the switch 14' and converter 18' corresponding respectively to the elements 10, 14 and 18 described in conjunction with FIGS. 1 and 2.

An expanded arrangement may be provided as shown in FIG. 4 wherein the output $E_o$ is applied, together with the analogue signal $E_3$ to the differential amplifier 36. Thus the output is $E_R = E_3$.

Figure 5:
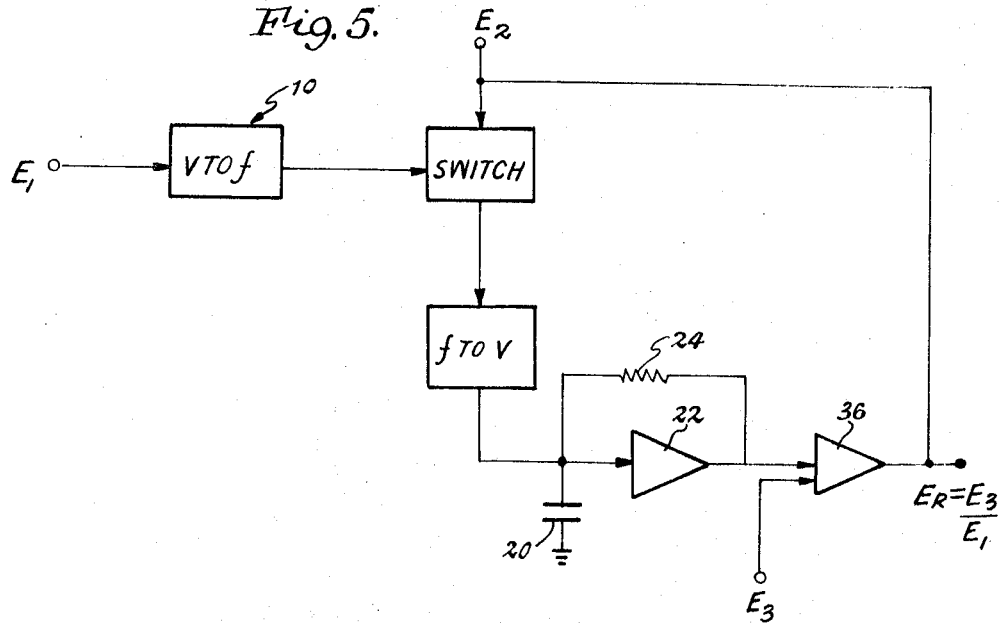
FIG. 5 is a view similar to FIG. 4 but showing the system connected to perform division.

To perform division, the arrangement of FIG. 5 may be used, wherein the condition $E_2 = E_R$ prevails. Thus, since $$E_0 = E_3 = E_1 E_2 = E_1 E_R, \quad E_R = \frac{E_3}{E_1}$$

Figure 6:
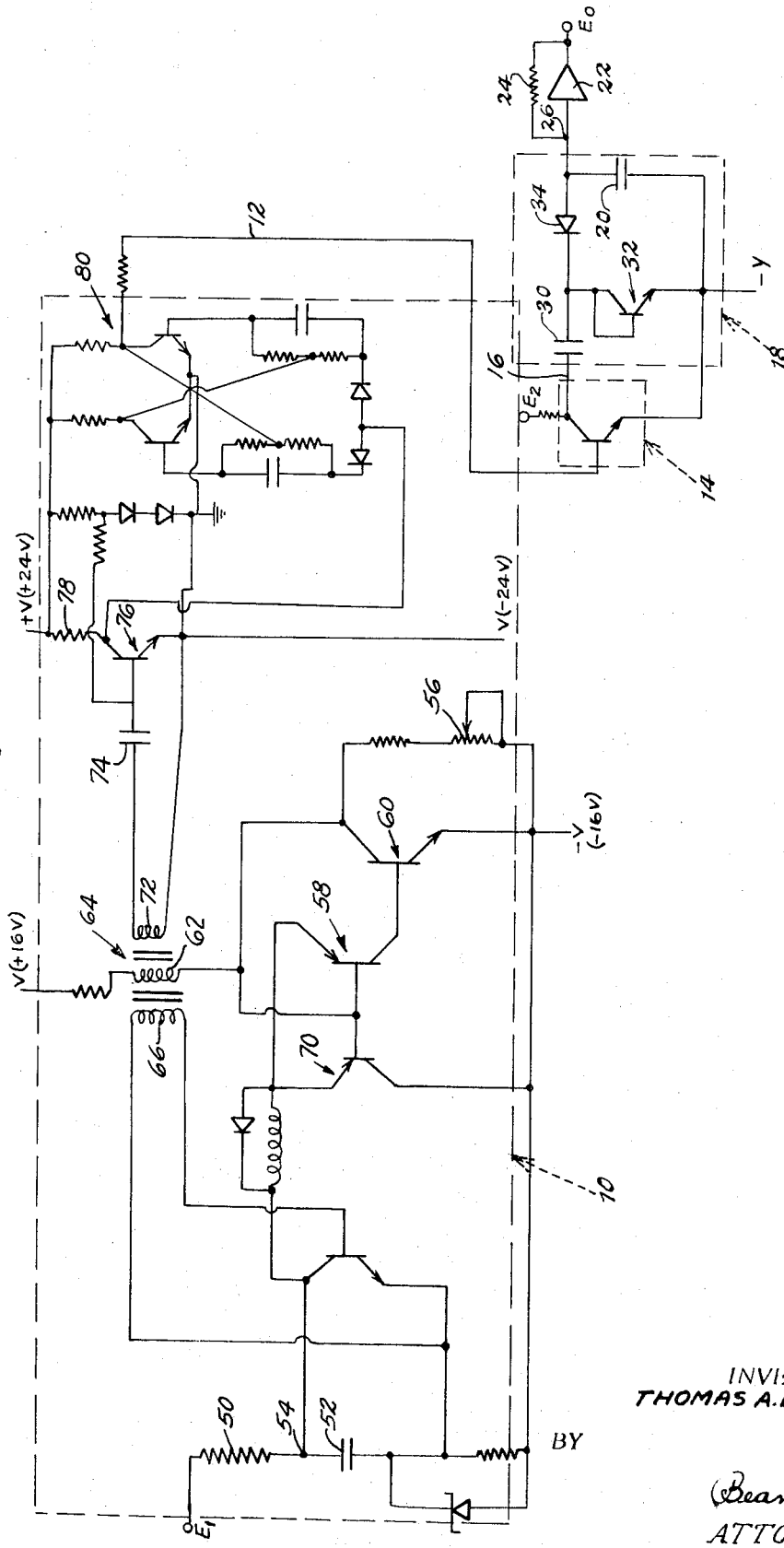
FIG. 6 is a view showing an exemplary circuit.

An exemplary circuit for instrumenting the block diagrams of FIGS. 1 and 2 is shown in FIG. 6. The linear analogue-to-digital converter 10 may take many forms and the switch 14 may form a part of the pump diode circuit for digital-to-analogue conversion as shown. In FIG. 6, the transistor switch 16 performs the function of alternately charging and dumping the capacitor 30 in contrast to the arrangement shown in FIG. 2 and thus forms an essential part of the circuit 18. The two arrangements are functionally equivalent, but that shown in FIG. 6 avoids the necessity for using the low impedance element 28 of FIG. 2.

In any event, it will be appreciated that the charges cyclically transferred to the capacitor 20 are linearized by virtue of the fact that the feedback amplifier discharges this capacitor at a rate equal to the time average of the charging pulses thereto, thus to maintain the voltage drop across the capacitor at some fixed value. That is to say, after such charge transfer, the capacitor is returned to some fixed reference potential with the result that the voltage drop across the feedback path very faithfully reflects the product of the analogue inputs. The amplifier 22 of FIGS. 1—5 preferably takes the form of a conventional DC amplifier 38 followed by the buffer amplifier 40.

In FIG. 6, the voltage $E_1$ is applied across the resistor 50 to the capacitor 52 which charges at a rate proportional to the input voltage $E_1$. When the voltage at the junction 54 reaches a predetermined value as set by the variable resistor 56, the trigger comprising the transistors 58 and 60 responds, the transistor 60 conducting collector current to produce a voltage pulse across the primary winding 62 of the pulse output transformer 64. As a result, the secondary winding 66 biases the transistor 68 to return the capacitor 52 to reference potential whereby the trigger circuit resets, the transistor 70 being provided to assure such reset.

The other secondary winding 72 of the transformer 64 is coupled through the capacitor 74 to the pulse amplifier 76 whose load resistor 78 is coupled to the scale-of-two circuit 80. The output of the scale-of-two circuit (at the conductor 12 of FIG. 1) is at one-half the frequency of the signal at the junction 54 and is of square wave form, the pulse durations and amplitudes of which are fixed by the characteristics 6 of the scale-of-two circuit 80, and which provides the input to the switch 14.

I claim:

1. In a computational circuit, in combination:
a capacitor;
means for supplying charging current to said capacitor at a rate proportional to the product of a pair of analogue inputs; and
an amplifier having an output and having an input connected to said capacitor and including a feedback path from its output to its input for removing the charge on said capacitor at the same rate at which it is charged by said means, whereby the voltage drop across said feedback path is proportional to the product of said inputs.

2. In the computational circuit according to claim 1 wherein said means supplies charging current to said capacitor proportional to the sum of a plurality of pairs of analogue inputs, whereby the voltage drop across said feedback path is proportional to the sum of the products of said pairs of inputs.

3. In the computational circuit according to claim 1 including a differential amplifier having the output of said feedback amplifier and a third analogue input as analogue inputs thereto, the output of said differential amplifier being connected to provide one of said pair of analogue inputs whereby the output of said differential amplifier is equal to the quotient of the third analogue input divided by the other of said pair of inputs.

4. In the computational circuit according to claim 1 including a differential amplifier having the output of said feedback amplifier and a third analogue input as analogue inputs thereto, the output of said differential amplifier being connected to provide both of said pair of analogue inputs whereby the output of said differential amplifier is equal to the square root of said third input.

5. In the computational circuit according to claim 1 wherein said means comprises an analogue-to-digital device for converting one of said analogue inputs to a digital signal whose frequency is linearly related to the amplitude of said one analogue input, a switch device controlled by said digital signal for passing the other of said analogue inputs at every switch closing, a load resistor receiving the output of said switch device, a second capacitor and diode for charging the second capacitor across said load resistor when said switch device is closed, and a diode coupling said first and second capacitors to transfer the charge on said second capacitor to said first capacitor when said switch device is open.

6. In the computational circuit according to claim 5 wherein said means supplies charging current to said capacitor proportional to the sum of a plurality of pairs of analogue inputs, whereby the voltage drop across said feedback path is proportional to the sum of the products of said pairs of analogue inputs.

7. In the computational circuit according to claim 5 including a differential amplifier having the output of said feedback amplifier and a third analogue input as inputs thereto, the output of said differential amplifier being connected to provide one of said pair of analogue inputs whereby the output of said differential amplifier is equal to the quotient of the third analogue input divided by the other of said pair of analogue inputs.

8. In the computational circuit according to claim 5 including a differential amplifier having the output of said feedback amplifier and a third analogue input as inputs thereto, the output of said differential amplifier being connected to provide both of said pair of analogue inputs whereby the output of said differential amplifier is equal to the square root of said third analogue input.

9. In the computational circuit, in combination:
a capacitor;
means for supplying a train of charging pulses to said capacitor, the time-average value of which train is proportional to the product of a pair of analogue inputs; and
amplifier means having a feedback path for continuously removing charge from said capacitor at the same rate as is deposited by the first mentioned means, whereby the voltage drop across said feedback path is proportional to said product.

UNITED STATES PATENT OFFICE
CERTIFICATE OF CORRECTION

Patent No. 3,569,688      Dated March 9, 1971

Inventor(s) Thomas A. Brendle

It is certified that error appears in the above-identified patent and that said Letters Patent are hereby corrected as shown below:

Column 1, line 12, cancel "amplifier", second occurrence
Column 2, line 24, the equation should appear as shown below:

$$\sum_{j=1}^{n} E_{,j} E_{\frac{j}{2}}$$

Column 4, line 18, after "input as" insert -- analogue --; li 26, after "input as" insert -- analogue --.

Signed and sealed this 25th day of July 1972.

(SEAL)
Attest:

EDWARD M. FLETCHER, JR.      ROBERT GOTTSCHALK
Attesting Officer      Commissioner of Patents